United States Patent Office 3,424,794
Patented Jan. 28, 1969

3,424,794
**DI-, TRI- AND TETRA-QUATERNARY
AMMONIUM COMPOUNDS**
Eugene J. Miller, Jr., Wheaton, and Ago Mais, La Grange Park, Ill., assignors, by mesne assignments, to Armour Industrial Chemical Company, a corporation of Delaware
No Drawing. Filed Mar. 1, 1965, Ser. No. 436,378
U.S. Cl. 260—567.6       5 Claims
Int. Cl. C07c 87/04; A61k 27/00

ABSTRACT OF THE DISCLOSURE

Sec-alkyl primary amines are quaternized with an alkyl quaternary agent and, if necessary, a neutralizer to form di-, tri-, and tetra-quaternaries.

---

This invention relates to novel polyquaternary amines, and more particularly to new di-, tri- and tetraquaternary secondary-alkyl amines. Such quaternary amines are particularly attractive to the cationic surfactant and emulsifier trade, and to the bactericide and algaecide trade because they are soluble in water and soluble in many solvents, both polar and non-polar, and therefore, can be sold in liquid form, thus making them exceptionally easy to handle, store and formulate with other ingredients into commercial products.

Recently, there has been disclosed a new series of and a method for making isomeric mixtures of secondary-alkyl primary amines and diamines (Journal of the American Oil Chemists' Society, vol. 41, pages 78 to 82 (1964)), and the respective diamine and tetramine derivatives thereof derived by the reaction of acrylonitrile with said primary amines and diamines. Also, the singular compounds of said mixture have been known. There has also been disclosed a new series of and a method for making sec-alkyl methylated tertiary amine compounds based on the aforementioned series. All such fall into the following formula:

FORMULA I

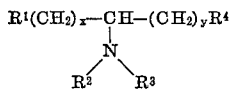

wherein $R^1$ is selected from the group consisting of hydrogen, an unsubstituted aryl radical, a substituted aryl radical, an aliphatic radical, and a cycloaliphtic radical.
$R^2$ is selected from the group consisting of hydrogen and a methyl radical.
$R^3$ is selected from the group consisting of $R^2$ and $-CH_2CH_2CH_2N(R^2)_2$ with $R^2$ as defined above.
$R^4$ is selected from the group consisting of hydrogen and $-NR^2R^3$ with $R^2$ and $R^3$ as defined above, provided when $R^4$ is hydrogen, $R^3$ is $-CH_2CH_2CH_2N(R^2)_2$.
$x$ and $y$ are positive integers having a sum from 2 to about 47.

An object of this invention is to provide novel compounds from said new series of sec-alkyl primary diamines and the methylated tertiary derivatives thereof.

Another object is to provide a method for producing said compounds.

Still another object is to provide novel di-, tri-, and tetra-quaternary compounds.

A further object is to provide novel liquid surfactants and emulsifiers.

A still further object is to provide novel liquid disinfectants.

Other objects of the invention will in part be obvious and will in part appear hereinafter.

In accord with such objects, a novel class of mono- and polyquaternaries may be made by reacting an alkyl salt with one or more sec-alkyl primary diamines and the respective diamine and tertamine derivatives of the above formula in the presence of a neutralizing agent. One or more methylated tertiary derivatives of the above amino compounds may also be quaternized but without neutralizing agent since no free acid is liberated in the quaternization process.

More particularly, when one or more sec-alkyl primary diamines and the respective diamine and tetraamine derivatives thereof falling within Formula I are reacted with excess alkylating agent, such as an alkyl halide or sulfate, in the presence of a neutralizing agent, such as sodium bicarbonate or any base capable of neutralizing the acid that is generated during quaternization, or when one or more sec-alkyl methylated tertiary amine derivatives of the aforementioned amino compounds are reacted with excess alkylating agent in the absence of a neutralizing agent since no substantial acid is generated, at elevated temperature in the range of 50° to 100° C., and pressure in the range of 15 to 700 p.s.i.g. for a period of time of about one-half to twenty-five hours, a novel di-, tri-, or tetra-quaternary compound or mixture of compounds is formed falling within the following formula:

FORMULA II

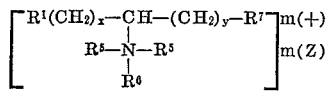

wherein $R^1$ is selected from the group consisting of hydrogen, an unsubstituted aryl radical, a substituted aryl radical, an aliphatic radical, and a cycloaliphatic radical.
$R^5$ is selected from the group consisting of a methyl radical and an ethyl radical.
$R^6$ is selected from the group consisting of $R^5$ and $-CH_2CH_2CH_2N(R^5)_3$ with $R^5$ as defined above.
$R^7$ is selected from the group consisting of hydrogen and $-N(R^5)_2R^6$, with $R^5$ and $R^6$ as defined above; provided, when $R^7$ is hydrogen, $R^6$ is
$$-CH_2CH_2CH_2N(R^5)_3$$
$x$ and $y$ are positive integers having a sum from 2 to about 47.
$Z$ is selected from the group consisting of $Cl^-$, $Br^-$, $I^-$, $CH_3OSO_3^-$, $NO_3^-$, $NO_2^-$ and $OH^-$.
$m$ is an integer ranging from 1 to 4 and is equal to the number of quaternary nitrogens in the molecule.

The invention accordingly comprises the several steps and the relation of one or more of such steps with respect to each of the others, and the compound possessing the features, properties and the relation of elements, which are exemplified in the following detailed disclosure, and the scope of the invention will be indicated in the claims.

For a fuller understanding of the nature and objects of the invention, reference should be had to the following detailed examples:

Example I

A two-liter autoclave is charged with 243.7 gms. (0.89 mole) of N-(γ-aminopropyl) $C_{11}$–$C_{15}$ sec-alkylamine, 149 gms. (1.77 moles) of sodium bicarbonate and 250 ml. of isopropanol. The autoclave is then sealed and methyl chloride added to a pressure of 55 p.s.i.g. at room temperature. The temperature is raised to 95° C. and the pressure increased to about 600 p.s.i.g. A temperature of 90–95° C. and a methyl chloride pressure of 200–600 p.s.i.g. is maintained for 35 hours with periodic venting and addition of sodium bicarbonate until a total of 5.5 moles are added. After the free amine and amine hydrochloride content each drop below 3.0%, the sodium chloride and excess sodium bicarbonate are removed by filtration to yield an isopropanol solution of the methyl chloride quaternary of N-(γ-aminopropyl) $C_{11}$–$C_{15}$ sec-alkylamine. The product was concentrated.

Analysis: Percent
- Activity _____ 69
- Free amine _____ 1.36
- Amine HCl _____ 1.58

Physical properties:
- Color _____ Gardner 12
- M.P., ° F.[1] _____ −40
- Cloud point, ° F. _____ −20
- Specific gravity (25° C.) _____ 0.954

[1] Did not crystallize, but was so viscous that it would not pour.

Typical solubilities:
- Water, percent _____ 100
- Acetone _____ <5
- Isopropyl alcohol _____ 25
- Ethyl alcohol _____ 100
- Ethylene glycol _____ 70
- Kerosene _____ Insoluble
- Fuel oil _____ Insoluble
- Mineral spirits _____ Insoluble
- Mineral oil _____ Insoluble Example II In similar fashion to Example IV, N-(γ-aminopropyl) $C_{15}$–$C_{20}$ sec-alkylamine is quaternized with methyl chloride in isopropanol at 90–95° C. and 200–600 p.s.i.g. in 15–20 hours.

Analysis: Percent
- Quaternary _____ 59.1
- Free amine _____ 1.28
- Amine HCl _____ 1.31

Physical properties:
- Color _____ Gardner 12
- M.P., ° F. _____ 49
- Cloud point, ° F. _____ 56
- Specific gravity (25° C.) _____ 0.915

Typical solubilities:
- Water, percent _____ 100
- Acetone _____ Insoluble
- Isopropyl alcohol _____ 100
- Ethyl alcohol _____ 100
- Ethylene glycol _____ 100
- Kerosene _____ <2
- Fuel oil _____ 100
- Mineral spirits _____ 100
- Mineral oil _____ <2

Example III

A 500-ml. glass reactor is charged with 64.5 gms. (0.217 mole) of 1-amino-sec-octadecylamine, 80.5 gms. (0.96 mole) of sodium bicarbonate and 75 ml. of isopropanol. The temperature is raised to 65–75° C. and 70–75 p.s.i.g. of methyl chloride is added. The temperature and pressure are maintained at 76–75° C./70–75 p.s.i.g. for 10 hours with periodic venting. Then, after the free amine and amine hydrochloride content drop below 1.5%, sodium chloride and excess sodium bicarbonate are removed by filtration to yield an isopropanol solution of N,N,N,N′,N′,N′-hexamethyl-sec-octadecyl-di(ammonium chloride).

Analysis: Percent
- Quaternary _____ 42.5
- Free amine _____ 0.23
- Amine HCl _____ 0.54

Example IV

A 500-ml. glass reactor was charged with 10.8 gms. (0.026 mole) of N,N′-di-(γ-aminopropyl)-1-amino-sec-octadecylamine, 22.0 gms. (0.26 mole) of sodium bicarbonate and 100 ml. of isopropanol. The temperature was raised to 80° C. and 60–70 p.s.i.g. of methyl chloride was added. The temperature and pressure were maintained at 80–85° C./60–70 p.s.i.g. for seven hours with periodic venting. After the free amine and amine hydrochloride dropped below 5.0%, sodium chloride and excess sodium bicarbonate were removed by filtration to yield an isopropanol solution of the methyl chloride tetraquaternary of N,N′-di-(γ-aminopropyl)-1-amino-sec-octadecylamine. After concentrating the solution, the product had the following analysis:

Percent
- Quaternary _____ 38.0
- Free amine _____ 4.5
- Amine HCl _____ Nil

The secondary-alkyl primary diamines; the diamine and tetraamine derivatives thereof; and the methylated tertiary derivatives of the above amino compounds that are useful in the process of this invention are indicated above. They fall within Formula I.

The alkyl quaternizing agents that may be used are one or more of the following: methyl chloride, methyl bromide, methyl iodide, methyl sulfate, ethyl chloride, ethyl bromide, ethyl iodide, ethyl sulfate, and the like.

The neutralization agents that are useful when needed fall within a relatively wide scope of compounds. Among such compounds are the alkali metal bases, such as sodium or potassium bicarbonate, sodium or potassium bicarbonate, sodium or potassium carbonate, sodium or potassium hydroxide and the like. A concentration of about one molecular equivalent of base per amino hydrogen is needed.

Any reaction solvent may be used, such as methanol, ethanol, isopropanol, butanol, or any other suitable polar solvent.

The above di-, tri-, and tetra-quaternaries are excellent cationic surfactants and emulsifiers. They are also outstanding bactericides and algaecides useful in chemical processing, cosmetics, petroleum, plastics, textiles and water treatment. Their exceptionally low melting points and cloud points make them easy to handle and store and formulate with other ingredients into useful compositions. For example, the isopropyl alcohol solution of quaternary formed in Example I is liquid at a temperature below minus 90° F.

The compounds of this invention are also soluble in water and in polar solvents as indicated in the tables following some of the examples above. Some, such as the compound of Example II, are completely soluble in fuel oil. Thus, formulation with other ingredients into useful marketable compositions is still further simplified.

It will thus be seen that the objects set forth above, among those made apparent from the preceding description, are efficiently attained and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described, what is claimed as new and desired to be secured by Letters Patent is:

1. The di-, tri-, and tetraquaternary ammonium compounds falling within the following formula:

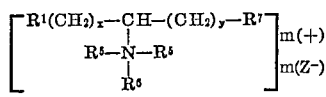

wherein
$R^1$ is hydrogen.

$R^5$ is selected from the group consisting of a methyl radical and an ethyl radical.

$R^6$ is selected from the group consisting of $R^5$ and $-CH_2CH_2CH_2N(R^5)_3$ with $R^5$ as defined above.

$R^7$ is selected from the group consisting of hydrogen and $-N(R^5)_2R^6$, with $R^5$ and $R^6$ as defined above, provided, when $R^7$ is hydrogen, $R^6$ is $$-CH_2CH_2CH_2N(R^5)_3$$

$x$ and $y$ are positive integers having a sum from 2 to about 47.

Z is selected from the group consisting of $Cl^-$, $Br^-$, $I^-$, $CH_3OSO_3^-$, $NO_3^-$, $NO_2^-$, and $OH^-$.

$m$ is an integer ranging from 1 to 4 and is equal to the number of quaternary nitrogens in the molecule.

2. N,N,N,N',N',N'-hexamethyl - sec - octadecyl-di-(ammonium chloride).

3. The methyl chloride diquaternary of N-(γ-aminopropyl) $C_{11}$–$C_{15}$ secondary-alkylamine.

4. The methyl chloride diquaternary of N-(γ-aminopropyl) $C_{15}$–$C_{20}$ secondary-alkylamine.

5. The methyl chloride tetraquaternary of N,N'-di-(γ-aminopropyl)-1-amino-sec-octadecylamine.

References Cited

UNITED STATES PATENTS 3,073,864  1/1963  Harrison et al. ____ 260—567.6

CHARLES B. PARKER, *Primary Examiner.*

ROBERT V. HINES, *Assistant Examiner.*

U.S. Cl. X.R.

252—8.8, 8.75, 355, 357, 358; 260—459, 465, 465.5, 518, 558, 561, 563, 570.5, 583, 999